United States Patent
Giannozzi

(10) Patent No.: US 6,986,951 B2
(45) Date of Patent: Jan. 17, 2006

(54) COBALT-BASED ALLOY FOR THE COATING OF ORGANS SUBJECT TO EROSION BY LIQUID

(75) Inventor: Massimo Giannozzi, Florence (IT)

(73) Assignee: Nuovo Pignone Holdings S.p.A., Florence (IT)

( * ) Notice: Subject to any disclaimer, the term of this patent is extended or adjusted under 35 U.S.C. 154(b) by 104 days.

(21) Appl. No.: 10/670,121

(22) Filed: Sep. 25, 2003

(65) Prior Publication Data

US 2004/0106000 A1    Jun. 3, 2004

(30) Foreign Application Priority Data

Sep. 27, 2002  (IT) ......................... MI2002A2056

(51) Int. Cl.
  B32B 15/01  (2006.01)
  C22C 19/07  (2006.01)

(52) U.S. Cl. ............... 428/668; 428/679; 428/926; 148/408; 148/425; 148/442; 420/435; 420/436; 420/437; 420/438; 420/439; 420/440; 420/580; 420/588

(58) Field of Classification Search ............... 428/668, 428/679, 926; 420/436, 435, 437, 438, 439, 420/440, 580, 588; 148/408, 425, 442
See application file for complete search history.

(56) References Cited

FOREIGN PATENT DOCUMENTS

JP    11336502 A  * 12/1999

OTHER PUBLICATIONS

"Material Safety Data Sheet—Stellite Tips", Deloro Stellite Inc., Belleville, Ontario, Canada; Prepared by L. L. Palmateer—Quality Manager; 6 sheets; Jan., 1998; Internet site—http://www.armstrongblue.com/Publications/msds_stellite_tips.htm.*

* cited by examiner

*Primary Examiner*—Robert R. Koehler
(74) *Attorney, Agent, or Firm*—Nixon & Vanderhye

(57) ABSTRACT

The present invention relates to a cobalt-based alloy for the coating of organs subject to erosion by liquid comprising chromium 28–32% by weight, tungsten 6–8% by weight, silicon 0.1–2% by weight, carbon 1.2–1.7% by weight, nickel 3–6% by weight, molybdenum 1–3%, cobalt the complement to 100%. The invention also relates to an application method of the alloy on organs subject to erosion by liquid, in particular vapour turbine blades, to reduce the metal erosion rate following impact with liquids.

8 Claims, 1 Drawing Sheet

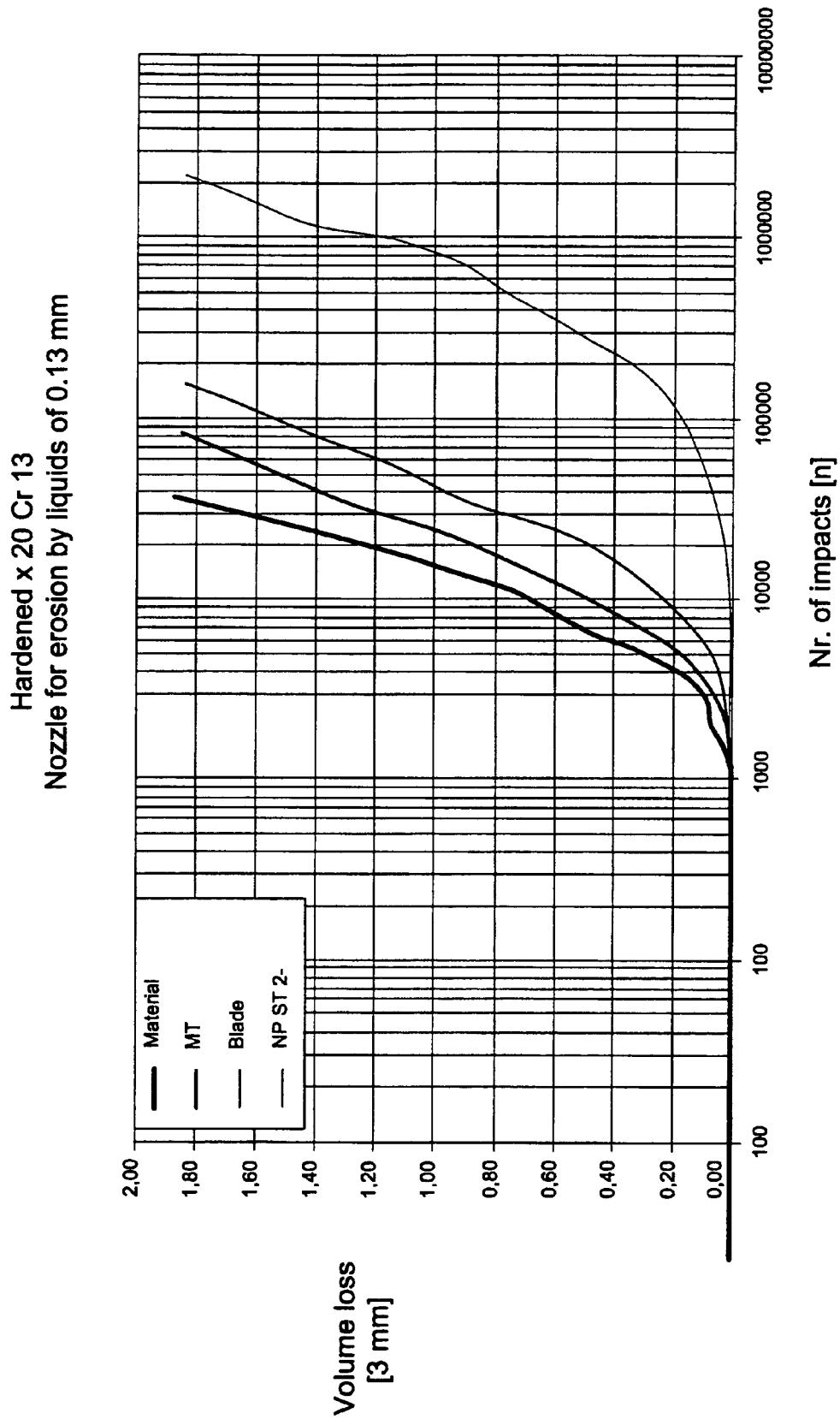

COBALT-BASED ALLOY FOR THE COATING OF ORGANS SUBJECT TO EROSION BY LIQUID

BACKGROUND OF THE INVENTION

The present invention relates to a cobalt-based alloy for the coating of organs subject to erosion by liquid.

In particular, the present invention relates to a cobalt-based alloy in powder form suitable for the coating of organs subject to erosion by liquid such as the blades of vapour turbines and the relative application method to increase its resistance to erosion following impact with liquid particles.

It is known that in vapour turbines the condensation pressure values must be as low as possible in order to obtain the highest outlet power in simple and combined cycles.

Under these operating conditions, the low pressure rotor blades are subjected to different chemical and physical stress and therefore undergo erosion processes due both to the presence of numerous water particles in the vapour flow and also to the high peak rates of the blades.

The erosion phenomena of vapour turbine components, which occur as a result of repeated impact with liquids under prolonged operating conditions, have already been the subject of studies and are documented in Wear, M. Lesser 1995, 28–34.

In order to avoid the drawbacks due to these erosion phenomena, attempts were made to solve the problem, from the design point of view, by increasing the axial spacing between the stator and rotor or by extracting the humidity between the rows of blades through holes or air gaps situated on the blades of the stator.

These remediations did not prove to be particularly suitable for solving the problem, as they cause a reduction in the performances of the turbine.

Attempts were then made to prolong the average operating life of the turbine blades, by studying new coating materials which are capable of reducing the erosion rate of the metals caused by impact liquid separation (F. J. Heymann, ASM Handbook Vol. 18, page 221).

The improvements in this field have so far been reached by resorting to specific treatment on the metal surface of the blades, such as induction or local flame hardening, by means of stellite plate brazing or with tool steels, or by means of hard coatings applied by welding. In order to evaluate the resistance to erosion, the coating materials of the known art have been subdivided, approximately, into two groups, that of carbides and that of metallic materials among which Stellite 6, according to what is already described in literature for example in the publication "Erosion-resistant Coating for Low-Pressure Steam Turbine Blades, Euromat '99".

Ionic nitriding with PVD coating using titanium nitride and chromium or zirconium nitride were selected for the surface treatment.

The blades subjected to ionic nitriding treatment followed by two subsequent PVD coatings were made up of a layer of titanium nitride followed by a coating of zirconium nitride or chromium nitride.

All the PVD coatings had a thickness of about 3–4 µm. The coating tests showed a coating discontinuity of the models and the behaviour was considered unsatisfactory.

A SEM test revealed that the PVD coating was not substantially capable of opposing impact erosion whereas the nitride layer was subject to lesions as a result of microfractures together with the foil nitrides present in the structure.

Blades with metallic coatings were then tested with HVOF (Triballoy 800).

The performances of the Triballoy 800 alloy, as coating material against erosion from liquids, proved to be inadequate.

From the indications obtained in the tests effected, it can in fact be held that these metal alloy coatings are not even as effective, in limiting erosion phenomena, as uncoated surfaces of the base material.

This behaviour on the part of the Triballoy 800 alloy is verified both by the results of the adhesion tests (all the coatings tested did not pass this test) and also through SEM micrographic observation which revealed the presence of numerous micro-fractures in the coating layer. The microstructure of these coatings, in fact, has a high oxide content and a marked porosity which make it unsuitable for resisting erosion by liquids.

Blades with metallic coatings (Stellite 6) were then tested with HVOF.

Although stellite alloys are known as being a material suitable for coating, they show all their limits when applied by means of HVOF. Micrographic analysis, in fact, demonstrates that low content particles are also enveloped in a film of oxide.

This fact is also confirmed by the surface morphology revealed by means of SEM, which shows a detachment or ungluing of the material specifically along these particles.

Blades treated with coatings with HVOF and SD-Gun TM carbides were then tested.

The results obtained with these types of coatings are in some cases comparable to or better than those obtained with the hardened base material (WC-10Co-4CrSD-Gun ™ and 88 WC-12Co HVOF).

The cases in which an unsatisfactory behaviour is verified can be explained by the reduced adhesion of the coating and through the known intrinsic fragility (due to the presence of chromium carbides).

Vice versa, the coatings of the known art which provide better results are those made of tungsten carbides with a cobalt or chromium-cobalt matrix, depending on the coating process used.

Coatings which have a good resistance to erosion are characterized by a detachment of the material on a small portion of the sample whereas this phenomenon is extended to a much larger surface of the materials whose resistance properties are considered unsatisfactory.

This different behaviour can be explained by considering the surface morphology.

When the layer of surface coating starts losing its conformation following the loss of material, the liquid/solid interaction is particularly complex. In this situation, the impulse or impact pressures which trigger the erosion phenomenon, are greatly influenced by the point in which there is initial contact with the drops which fall on a crest (slope), developing lower local pressures with respect to the drops which fall into a crater.

In the case of base materials, the low resistance effected by the surface makes the removal of the material almost completely uniform along the whole area involved in the test.

The unsatisfactory behaviour of most of the coatings of the known art can be explained by the reduced adhesion of the coating on the metallic substrate and the well known intrinsic fragility (due to the presence of chromium carbides).

Vice versa, the coatings of the art which provide improved results are those consisting of tungsten carbides with a cobalt, chromium-cobalt matrix, depending on the use of the coating process.

In general, the performances of the coatings with HVOF improve with an increase in the content of tungsten carbide. The micrographic morphology of the 88WC-12Co coating is, in fact, more homogeneous with respect to that of 83WC-17Co. On the other hand, the difference in performance of the same material (WC10Co-4Cr), applied by means of SD-Gun™ or HVOF is quite marked. The results of the former are encouraging, whereas those of the latter are unsatisfactory.

This confirms that at present the spraying process has a significant importance in obtaining certain performances of the coating.

The thermal treatment of the known art for increasing the hardness, however, has as yet shown a reduced increase in resistance to erosion due to an excessive fragility.

SUMMARY OF THE INVENTION

It has been verified that in the case of coatings by means of thermal spraying, an important parameter for evaluating the resistance to erosion by liquids is the adhesion resistance. A low value immediately suggests that the coating is not appropriate. An additional requisite for resistance to erosion is the good quality of the microstructure of the coating.

At the moment, the necessity is consequently felt for having new types of coating or treatment for gas turbine components which are capable of effectively reducing the metallic erosion rate due to separation by impact with liquids.

One of the general objectives of the present invention therefore consists in providing an alloy for the coating of vapour turbine components which is highly resistant to metallic erosion phenomena as a result of impact with liquids.

A further objective of the invention consists in providing a method for the treatment of the surfaces of metallic organs subject to erosion, in particular vapour turbine blades, which effectively increases the adhesion resistance of the coating applied.

The last but not least important objective consists in providing an alloy and a method for the coating of vapour turbine blades which is simple to produce and does not involve high production costs.

It has now been surprisingly found that it is possible to obtain a coating for vapour turbine components subject to erosion, by applying on the metallic surfaces of said components a cobalt-based alloy, having a composition which is particularly rich in tungsten and suitably selected.

The alloy according to the invention is of the stellite or Haynes alloy type, referring to a material which belongs to the group of non-ferrous hard alloys based on cobalt, chromium and tungsten, resistant to corrosion and wear.

In particular, the applicant has now identified an alloy composition which is particularly suitable for the coating of vapour turbine components, comprising:

| | |
|---|---|
| chromium | 28–32% by weight |
| tungsten | 6–8% by weight |
| silicon | 0.1–2% by weight |
| carbon | 1.2–1.7% by weight |

-continued

| | |
|---|---|
| nickel | 3–6% by weight |
| molybdenum | 1–3% by weight |
| cobalt | the complement to 100%. |

According to an embodiment, the alloy of the invention can also comprise iron 0.01 to 1% by weight and/or from 0.01 to 1% by weight of manganese. The alloy of the invention can also comprise iron 0–1% by weight, manganese 0–1% by weight and other elements in a quantity ranging from 0 to 0.5% by weight.

The alloy of the invention has an optimized selected chemical composition for enhancing the characteristics of anti-erosion by liquid when subjected to erosion phenomena such as, for example vapour turbine components.

It has been verified that the alloy compositions of the invention advantageously supplied in powder form, allow the production of a layer of coating on vapour turbine components which is highly resistant to mechanical stress caused by impact with liquid particles. The layer of coating applied typically has a thickness ranging from 0.1 to 5 mm.

In particular, from specific tests it has been observed that the use of the alloy of the invention allows the production of coatings having a higher resistance to erosion from impact with liquids by an order of magnitude (for example 2,100,000 of impacts against 180,000 with traditional hardening materials) with respect to the resistance values of other materials used in the known art. It has also been observed that the application of the alloy of the invention to the surface of turbine blades, causes an unexpectedly higher resistance to erosion with respect to the use of stellite compositions of the known type.

The alloy of the invention has a selected quantity of various elements which determines the resistance properties to corrosion by liquid when applied to the surfaces of turbine components.

In particular, the carbon content in the composition is optimized and balanced to form carbides having a suitable stoichiometry, the chromium content and high tungsten and molybdenum contents are selected to obtain an improved reinforcement for a solid solution and to obtain maximum precipitation values of carbides having a suitable stoichiometry. Furthermore, the alloy composition of the invention has a high nickel content, preferably from 3.5 to 5.5%, so as to increase the ductility of the alloy and resistance of the coating layer.

According to another aspect of the invention, a method is provided for the treatment of organs subject to erosion, in particular vapour turbine components, comprising the application of a cobalt-based alloy previously described to the surface of said organ or turbine component, to form an anti-erosion coating layer.

According to a preferred embodiment, the application of the coating to organs subject to erosion, such as for example blades, rotor, stator, vapour turbine plates, is effected by means of laser plating, advantageously using a laser apparatus with $CO_2$ or an Nd-Yag laser.

An alloy of the invention is in fact suitable for use in laser plating which comprises one or more passages on the surfaces of metallic organs subject to erosion so as to form one or more layers of coating.

According to an embodiment, the metallic material to be subjected to the anti-erosion treatment of the invention can be previously heated and then plated by means of laser cladding.

BRIEF DESCRIPTION OF THE DRAWING

The differences in the behaviour of a turbine component treated according to the method of the invention and metal components either non-plated or plated with products of the known art are evident from the enclosed drawing in which:

The FIGURE illustrates a graph relating to comparative liquid erosion tests on 4 metal samples.

DETAILED DESCRIPTION OF PREFERRED EMBODIMENTS

In particular, the enclosed figure illustrates a graph which indicates in abscissa the number of impacts and in ordinate the volume loss following impact with liquid drops.

The graph summarizes the results of erosion by liquid drops sprayed through a 0.13 mm nozzle on four test samples made of martensite stainless steel, the same material but with martempering treatment (MT), integral stellite and stainless steel coated with a layer produced by laser plating of the alloy of the invention, according to Example 1.

The graph indicates the increased resistance to erosion by liquid drops of the sample treated according to the invention with respect to the samples of the known art. Once the coating material, according to the present invention, has been applied to metallic surfaces of vapour turbine components, it has a high adhesion resistance. The high resistance properties of the coating produced with the method of the invention are also justified by its microstructural morphology.

It has in fact been observed that the structure of the coating produced with the laser technique is extremely thin and the removal of the material, which essentially takes place by means of cracking along the carbide bonds, is reduced even after prolonged periods of turbine activity.

Furthermore, the coating alloy applied according to the method of the invention only tends to become detached, following prolonged and repeated stress, on a reduced portion of the sample whereas this phenomenon involves a much wider surface area when the coating is made with materials of the known art.

The application of the laser technology consequently makes it possible to produce coatings with a high resistance to erosion by separation due to impact with liquids, reducing alteration of the base material to the minimum. The use of the laser technology also allows stress reducing treatment to be effected at temperatures slightly lower than the recovery temperature, thus avoiding any possible negative effects on the tensile strength.

The following examples are provided for the sole purpose of illustrating the present invention and should in no way be considered as limiting the protection scope according to the enclosed claims.

EXAMPLES

EXAMPLE 1

A composition was used, in powder form for the coating of mechanical vapour turbine components having the following formulation:

| | |
|---|---|
| Cr | 30% |
| W | 7% |
| Si | 1% |
| C | 1.5% |
| Ni | 4.5% |
| Fe | <0.3% |
| Mn | <0.3% |
| Co | 53.4% |
| Mo | 1.8% |
| Other | 0.25% |

The powder was applied to stainless steel turbine blades by means of YAG laser plating (laser cladding) forming a layer having a thickness equal to about 1.2 mm.

EXAMPLE 2

The following Table indicates various formulations of compositions in powder form according to the present invention.

| Element | Comp. 1 | Comp. 2 | Comp. 3 |
|---|---|---|---|
| Cr | 28% | 31.5% | 30% |
| W | 6.1% | 7.5% | 7% |
| Si | 0.2% | 1.8% | 1% |
| C | 1.3% | 1.6% | 1.5% |
| Ni | 3.2% | 5.8% | 4.5% |
| Fe | 0.01% | 0.9% | 0.5% |
| Mn | 0.01% | 0.8% | 0.3% |
| Mo | 1.1% | 2.9% | 2% |
| Co | Balance | Balance | Balance |
| Other | 0.01% | 0.005% | 0.05% |

What is claimed is:

1. A cobalt-based alloy for the coating of organs subject to erosion by liquids, comprising:

| | |
|---|---|
| chromium | 28 by weight |
| tungsten | 6.1% by weight |
| silicon | 0.2% by weight |
| carbon | 1.3% by weight |
| nickel | 3.2% by weight |
| molybdenum | 1.1% by weight |
| iron | 0.01% by weight |
| manganese | 0.01% by weight |
| cobalt | the complement to 100% by weight. |

2. A cobalt-based alloy for the coating of organs subject to erosion by liquids, comprising:

| | |
|---|---|
| Cr | 31.5% |
| W | 7.5% |
| Si | 1.8% |
| C | 1.6% |
| Ni | 5.8% |
| Fe | 0.9% |
| Mn | 0.8% |
| Mo | 2.9% |
| Co | Balance. |

3. A cobalt-based alloy for the coating of organs subject to erosion by liquids, comprising:

| | |
|---|---|
| Cr | 30% |
| W | 7% |
| Si | 1% |
| C | 1.5% |
| Ni | 4.5% |
| Fe | 0.5% |
| Mn | 0.3% |
| Mo | 2% |
| Co | Balance. |

4. A cobalt-based alloy for the coating of organs subject to erosion by liquids, comprising:

| | |
|---|---|
| Cr | 30% |
| W | 7% |
| Si | 1% |

-continued

| | |
|---|---|
| C | 1.5% |
| Ni | 4.5% |
| Fe | <0.3% |
| Mn | <0.3% |
| Co | 53.4% |
| Mo | 1.8% |
| Other | 0.25% |

5. An organ or end-product subject to erosion by liquids, wherein it comprises a surface coating to prevent erosion from liquids comprising an alloy coating according to claim 1.

6. The organ or end-product according to claim 5, wherein it is a component of a vapour turbine.

7. The organ or end-product according to claim 6, wherein said component is a blade of a gas turbine.

8. The organ according to claim 5, wherein said surface coating has a thickness ranging from 0.1 to 5 mm.

* * * * *

UNITED STATES PATENT AND TRADEMARK OFFICE
CERTIFICATE OF CORRECTION

PATENT NO. : 6,986,951 B2
DATED : January 17, 2006
INVENTOR(S) : Giannozzi, M.

It is certified that error appears in the above-identified patent and that said Letters Patent is hereby corrected as shown below:

Column 6,
Line 44, insert -- % -- after "28".

Signed and Sealed this

Second Day of May, 2006

JON W. DUDAS
*Director of the United States Patent and Trademark Office*